United States Patent [19]

Yamamoto et al.

[11] 4,363,878
[45] Dec. 14, 1982

[54] ALKALI- AND HEAT-RESISTANT INORGANIC FIBER

[75] Inventors: Osamu Yamamoto; Keishin Takehara; Yutaka Yasiro, all of Chiba, Japan

[73] Assignee: Nitto Boseki Co., Ltd., Fukushima, Japan

[21] Appl. No.: 241,692

[22] Filed: Mar. 9, 1981

[30] Foreign Application Priority Data

Mar. 17, 1980 [JP] Japan .................. 55-33840

[51] Int. Cl.³ .............................. C03C 13/00
[52] U.S. Cl. ........................... 501/36; 106/99; 501/28; 501/95
[58] Field of Search ............. 501/36, 35, 38, 28, 501/95, 69, 70; 106/99

[56] References Cited

U.S. PATENT DOCUMENTS

| | | | |
|---|---|---|---|
| 3,081,179 | 3/1963 | Charvat et al. | 501/35 |
| 3,348,956 | 10/1967 | Ekdahl | 501/95 |
| 4,205,992 | 6/1980 | Mogensen et al. | 501/36 |

FOREIGN PATENT DOCUMENTS

765244 1/1957 United Kingdom .................. 501/35

Primary Examiner—Helen M. McCarthy
Attorney, Agent, or Firm—Andrew D. Maslow

[57] ABSTRACT

The inorganic fiber of this invention comprising as major constituents

| | % by weight |
|---|---|
| $SiO_2$ | 40–50 |
| CaO | 0–10 |
| MgO | 15–25 |
| $Fe_2O_3$ + FeO | 0–10 |
| $Al_2O_3$ | 5–15 |
| MnO | 2–15 |

(provided that the total amount of CaO, $Fe_2O_3$, FeO and MnO is about 20% by weight) is excellent in alkali- and heat-resistances and is useful as a replacement of asbestos in asbestos-cement boards. Titanium oxide ($TiO_2$) is contained in natural rocks or slags to be used for the meltable material as an impurity in the amount of about 2% by weight.

2 Claims, 2 Drawing Figures

ALKALI- AND HEAT-RESISTANT INORGANIC FIBER

BACKGROUND OF THE INVENTION

1. Field of the Invention

This invention relates to an alkali- and heat-resistant inorganic fiber and, more particularly, to alkali- and heat-resistant inorganic fibers, in which the fiberizing temperature is approximately the same as those of customary rock fibers.

2. Description of the Prior Art

Heretofore, some of glass fibers have been known as alkali-resistant inorganic fibers. These glass fibers, however, show a high viscosity in the molten state such as, for example, 100 poises at 1,400° C. Owing to such high viscosity, one is unable to manufacture short fibers by a multirotor spinning process, which operates only under low melt viscosity conditions as in the case of rock fibers with a viscosity of several poises at 1,400° C. Moreover, there are other disadvantages for producing the alkali-resistant glass fibers. It is necessary to add zirconium oxide, which is expensive and, furthermore gives rise to an increased melting cost.

There has recently been disclosed alkali-resistant rock fibers which dispense with expensive zirconium oxide used in conventional alkali-resistant glass fibers U.S. Pat. No. 4,205,992, [Japanese Patent Application "Kokai" (Laid-open), No. 101,922/1979]. The disclosed fibers, however, have considerably high fiberizing temperature, comparing with those of customary rock fibers. This causes a remarkable increase in energy cost for manufacturing fibers of optimal diameter by means of a multirotor.

SUMMARY OF THE INVENTION

An object of this invention is to provide the alkali- and heat-resistant inorganic fiber manufactured by utilizing those natural rocks, slags and the like which are sufficiently available from the viewpoint of resources.

Another object of this invention is to provide the alkali- and heat-resistant inorganic fiber which can be manufactured economically by multirotor spinning process.

According to this invention, there is provided the alkali- and heat-resistant inorganic fibers comprising as major constituents

|  | % by weight |
| --- | --- |
| $SiO_2$ | 40–50 |
| CaO | 0–10 |
| MgO | 15–25 |
| $Fe_2O_3$ + FeO | 0–10 |
| $Al_2O_3$ | 5–15 |
| MnO | 2–15 |

(provided that the total amount of CaO, $Fe_2O_3$, FeO and MnO is limited within 20% by weight).

DETAILED DESCRIPTION OF THE INVENTION

Figure 1:
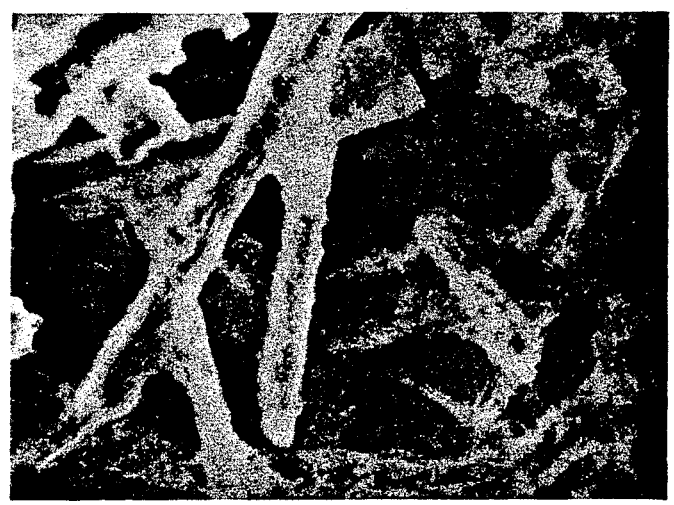
FIG. 1 shows an electron microscopic photograph of the rock fiber specimen of Comparative Example 1 in Table 1, which has been subjected to the alkali resistance test.

When one intends to obtain simply good fibers from a batch material having comparatively low viscosity without paying attention to the alkali and heat-resistance, the $SiO_2$ content of the meltable material should be in the range of 35 to 50% by weight. If the $SiO_2$ content is below 35% by weight, it is difficult to obtain good short fibers of 2 to 10 μm in diameter, whereas if the $SiO_2$ content exceeds 50% by weight, the fiber formation by the multirotor spinning process becomes difficult owing to an increased melt viscosity. However, in view of the alkali and heat resistances intended in this invention, it is desirable to increase the $SiO_2$ content, and if the $SiO_2$ content is less than 40% by weight, it is difficult to obtain the fibers having satisfactory alkali and heat resistances, relating to the content of other alkaline oxides. After all, it is necessary that the $SiO_2$ content should be in the range of 40 to 50% by weight, most preferably 45 to 50% by weight.

For the purpose of improving the strength and heat resistance of fibers, the CaO content of the meltable material should be confined within 10% by weight. If the CaO content exceeds 10% by weight, the heat resistance, as well as physical properties of fibers, will be lowered. The most preferable CaO content is in the range of 0 to 6% by weight.

In the sense of replenishing the above defect of CaO and to adjust the viscosity of the meltable material to a value suitable for the multirotor spinning process, MgO should be present in an amount of 15 to 25% by weight. If the MgO content exceeds 25% by weight, not only the melt viscosity becomes too low to keep the optimal fiber formation, but also to secure the necessary amount of acidic oxides, resulting in lowering the alkali resistance of the fiber. On the other hand, if the MgO content is less than 15% by weight, the melt viscosity becomes too high to be suitable for the fiber formation. The most preferred MgO content should be in the range of 18 to 23% by weight.

$Fe_2O_3$ and FeO are useful in improving the heat resistance and flexibility of the fiber of 2 to 10 μm in diameter. However, if their content exceeds 10% by weight, the alkali resistance of the fibers will be lowered. The most preferable content of $Fe_2O_3$ plus FeO should be in the range of 0 to 8% by weight.

Alumina ($Al_2O_3$) as well as silica ($SiO_2$) is effective in improving the fiber strength. However, with the increase in the $Al_2O_3$ content, the melt viscosity becomes higher and the devitrefication temperature increases, resulting in an increase in melting energy cost. If the $Al_2O_3$ content exceeds 15% by weight, the alkali resistance of the fibers will be lowered, whereas if it is below 5% by weight, good fibers may not be obtained. Therefore, the $Al_2O_3$ content should be restricted to the range of 5 to 15% by weight; the most preferable content is in the range of 5 to 10% by weight.

Manganese oxide (MnO) has favorable effects of producing a uniform melt, and also of imparting the good alkali resistance to the fibers. In the case of the rock fibers, unlike the glass fibers, the addition of 2 to 15% by weight of MnO produces a sufficient decrease in melt viscosity and exhibits stabilizing and clarifying effects for the melt. For instance, the addition of 5% by weight of MnO will decrease the optimal fiber forming temperature by about 80° C. However, the addition of MnO over 15% by weight is not only unnecessary but also undesirable to secure the necessary amount of $SiO_2$ for the optimal fiber formation. If the MnO content is below 2% by weight, the function of the MnO as a flux is no longer exhibited. The most preferable MnO is in the range of 5 to 10% by weight.

Apart from the above-mentioned specification for each constituent, the total amount of MnO, CaO, $Fe_2O_3$ and FeO should be within 20% by weight, because the total of 20% by weight makes the viscosity of the meltable material to the optimal level for the fiber formation by the multirotor spinning process. The superfluous addition of these constituents causes a negative factor for keeping the necessary amount of $SiO_2$ effective for the alkali resistance.

Titanium oxide ($TiO_2$) is contained in natural rocks or slags to be used for the meltable material as an impurity in the amount of about 2% by weight.

The major natural rock material to be used as raw material in producing the inorganic fibers of the composition as herein specified is found in olivine and metamorphous rocks thereof containing each 35% by weight or more of $SiO_2$ and MgO. Olivine has an advantage of being naturally occurred anywhere throughout Japan and available as raw material at low price.

A typical metamorphous rock of olivine is serpentine which can be used as a complete or partial substitute for olivine. However, as compared with olivine, generally the MgO content is smaller by about 5% and the $Fe_2O_3$ content is larger by about 3%. It is, therefore, advantageous to use olivine from the economical and other viewpoints. In order to obtain the starting material of the composition as herein specified, one needs to adjust the composition of the above-noted major natural rock material by adding the calculated amounts of basalt, diabase, vermiculite, pyrophyllite, and iron ore slag for $SiO_2$, CaO and $Al_2O_3$; silica stone and silica brick for $SiO_2$; and manganese silicate ore, manganese carbonate ore, manganese oxide ore, and silicomanganese slag for MgO. The selection and combination of these natural ores or slags are not subject to any particular restriction, unless the final composition departs from that specified herein.

In manufacturing the alkali- and heat-resistant inorganic fibers of this invention by using the said natural rocks and slags, conventionally well-known equipments and methods can be applied. For instance, the compounded raw material is melted in a cupola by heating at 1410° to 1460° C., the resulting melt is allowed to flow downward onto the surface of spinning rotors to fiberize the molten material, and the fibers formed in this way is collected by means of an air stream blown-off around the spinning rotors.

EXAMPLE

The compounded raw material according to this invention, shown in the column of Example in Table 1, was melted in a conventional cupola by heating at 1,430° C. The resulting melt was allowed to flow downward onto the surface of spinning rotors to fiberize the molten material, and the fibers formed in this way were collected by means of an air stream blown-off around the spinning rotor.

In Comparative Examples 1 and 2, the compounded raw materials shown in Table 1 were also formed into fiber and collected in the same manner as described above, except that the raw materials were melted at 1,460° and 1,540° C., respectively, which were the optimal fiber forming temperatures as shown in Table 2.

TABLE 1

| Comparative Example 1 | | Comparative Example 2 | | Example | |
|---|---|---|---|---|---|
| Slag | 91% | Basalt | 55% | Basalt | 45% |
| Silica stone | 9 | Olivine | 40 | Olivine | 40 |
| | | Silica stone | 5 | Silica stone | 10 |
| | | | | Manganese oxide ore | 5 |

The composition and characteristics of the inorganic fibers obtained according to this invention were shown in Table 2, where are also shown the compositions and characteristics of other rock fibers not covered by the present invention (Comparative Examples 1 to 3).

TABLE 2

| | Comparative Example 1 | Comparative Example 2 | Comparative Example 3 | Example |
|---|---|---|---|---|
| $SiO_2$ | 39.4% | 45.0% | 47.3% | 45.8% |
| CaO | 37.4 | 16.0 | 5.4 | 5.6 |
| MgO | 5.3 | 14.9 | 23.6 | 22.3 |
| $Fe_2O_3$ + FeO | 0.5 | 5.4 | 8.4 | 8.1 |
| $Al_2O_3$ | 13.4 | 16.7 | 12.5 | 9.6 |
| MnO | — | — | — | 4.1 |
| $TiO_2$ | 1.7 | 0.5 | 1.1 | 1.5 |
| Others | 2.3 | 1.5 | 2.6 | 3.0 |
| Melt viscosity | | | | |
| 1500° C. | 4.8 poises | 9.0 poises | 5.3 poises | 3.2 poises |
| 1450° C. | 6.5 | 11.0 | 6.9 | 4.5 |
| 1400° C. | 8.8 | 15.3 | 11.0 | 6.4 |
| 1350° C. | 14.0 | 23.0 | 30.0 | 11.0 |
| Optimal fiber-forming temperature | 1430–1480° C. | 1510–1560° C. | 1480–1530° C. | 1410–1460° C. |
| Average fiber diameter | 4.2μ | 3.7μ | 3.5μ | 3.3μ |
| Alkali resistance (weight loss) | 2.0% | 1.8% | 1.0% | 1.0% |
| Appearance of fiber after alkali resistance test | Discolored, brittle and disintegrated (see FIG. 1) | Discolored; disintegrated upon touch with hand | No change in both appearance and shape | No change in both appearance and shape (see FIG. 2) |
| Heat resistant tem- | 700– | 700– | 840– | 840– |

TABLE 2-continued

| | Comparative Example 1 | Comparative Example 2 | Comparative Example 3 | Example |
|---|---|---|---|---|
| perature | 720° C. | 720° C. | 860° C. | 860° C. |

Note:
(1) All percentages are by weight.
(2) The Comparative Example 1 indicates the customary rock fibers.
(3) The fibers of Comparative Example 2 are those of a composition not covered by the present invention.
(4) The Comparative Example 3 correspond to the rock fibers disclosed in Japanese Patent Application "Kokai" (Laid-open) No. 101,922/1979.
(5) Testing Method:
(a) Alkali resistance: 500 cc of 1 N NaOH and about 10 g (weighed precisely) of the sample are placed together in a tightly stoppered 1-liter polyethylene vessel and immersed in a hot water bath regulated at 80 ± 1° C. After 24 hours, the sample is washed with clean water, dried, then measured the weight loss.
(b) Heat-resistant temperature: A disc having a diameter of 500 mm, a thickness of 50–80 mm and a specific gravity of 0.5 is placed under a load of 10 g. The temperature of the disc is elevated at a rate of 10° C./minute until 500° C. and then at a rate of 5° C./minute. The temperature at which the sample has contracted in thickness by 10% is taken as the heat-resistant temperature.

FIG. 1 is an electron scanning microscopic photograph (x 1,000) of the customary rock fibers after having been subjected to the alkali-resistance test described in the above procedure (a). The fibers were observed to be so deteriorated to show the roughness of the fiber surface and the occurrence of disintegrated fiber fragments.

Figure 2:
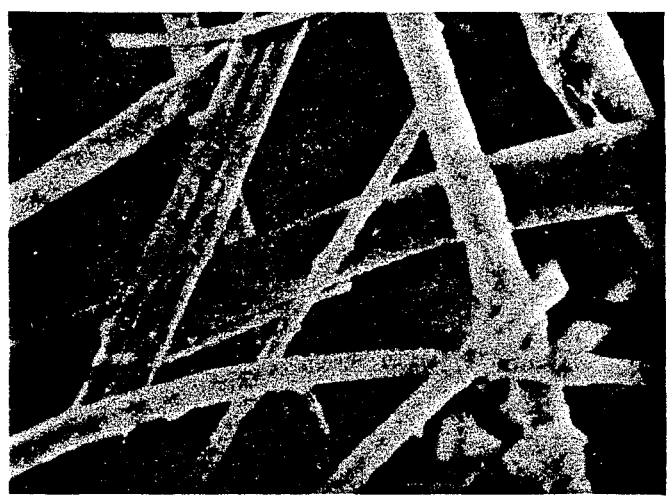
FIG. 2 shows an electron microscopic photograph of the alkali- and heat-resistant rock fiber specimen of this invention (Example) in Table 1, which has been subjected to the alkali resistance test.

FIG. 2 is an electron scanning microscopic photograph (x 1,000) of the inorganic fibers of this invention after having been subjected to the alkali resistance test described in the above procedure (a). It was observed that the fibers was kept their original shape, neither rough surface nor fiber fragments being detectable, indicating that the alkali resistance has been improved to a great extent.

As is apparent from Table 2, the fibers of this invention are superior in alkali resistance to those of the Comparative Examples 1 and 2. The fibers of the Comparative Example 3 show that alkali resistance is nearly equal to those of this invention. However, the example of this invention shows the lower optimal fiberizing temperature, which indicates the possibility of a remarkable saving in the melting energy. The heat-resistant temperature of the fibers of this invention is higher than that of the customary rock fibers by nearly 140° C.

The inorganic fibers of this invention having the good alkali and heat resistances, as described above, can be manufactured at low cost on commercial scale and used chiefly as a replacement of asbestos in asbestos-cement boards.

What is claimed is:
1. An alkali- and heat-resistant inorganic fiber consisting essentially of

| | % by weight |
|---|---|
| $SiO_2$ | 40–50 |
| CaO | 0–10 |
| MgO | 15–25 |
| $Fe_2O_3$ + FeO | 0–10 |
| $Al_2O_3$ | 5–15 |
| MnO | 2–15 | provided that the total amount of CaO, $Fe_2O_3$, FeO and MnO is about 20% by weight and having an optional fiber-forming temperature of about 1410°–1460° C.

2. An alkali- and heat-resistant inorganic fiber consisting essentially of:

| | % by weight |
|---|---|
| $SiO_2$ | 40–50 |
| CaO | 0–10 |
| MgO | 15–25 |
| $Fe_2O_3$ + FeO | 0–10 |
| $Al_2O_3$ | 5–15 |
| MnO | 2–15 | provided that the total amount of CaO, $Fe_2O_3$, FeO and MnO is about 20% by weight and having a melt viscosity at 1500° C. of about 3.2 poises or less.

* * * * *